APPARATUS AND METHOD FOR LEVELING AND EMPTYING MATERIAL IN AND FROM STORAGE BIN

Filed Nov. 9, 1966

INVENTOR
SYLVESTER L. STEFFEN
BY
[signature]
ATTORNEY

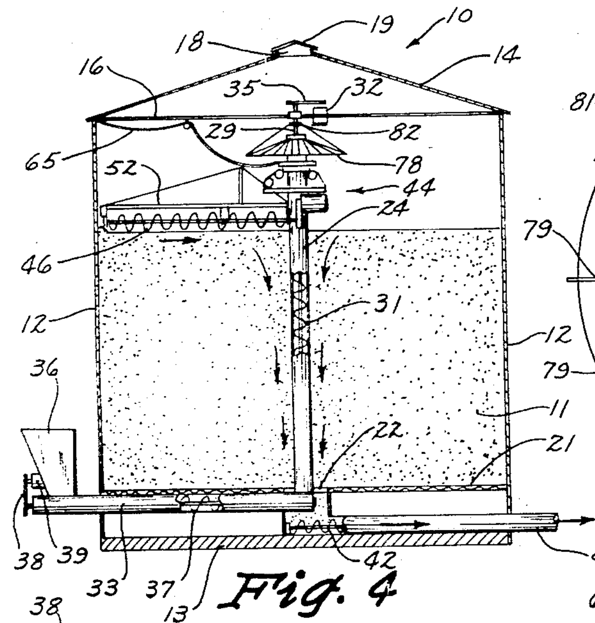
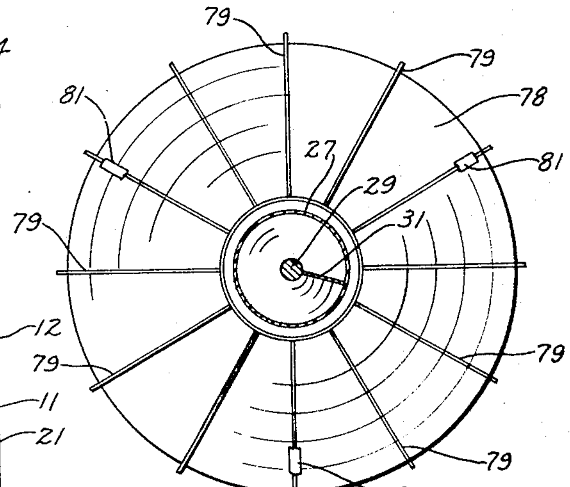
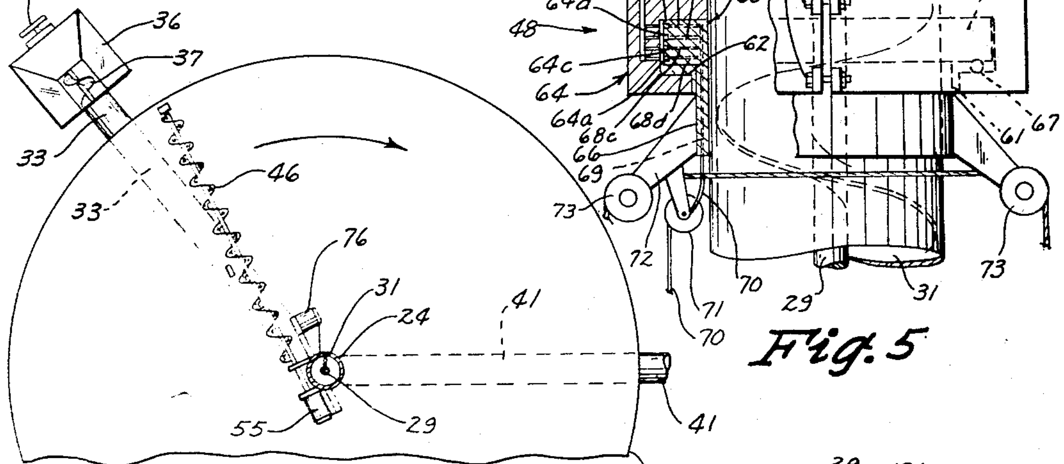
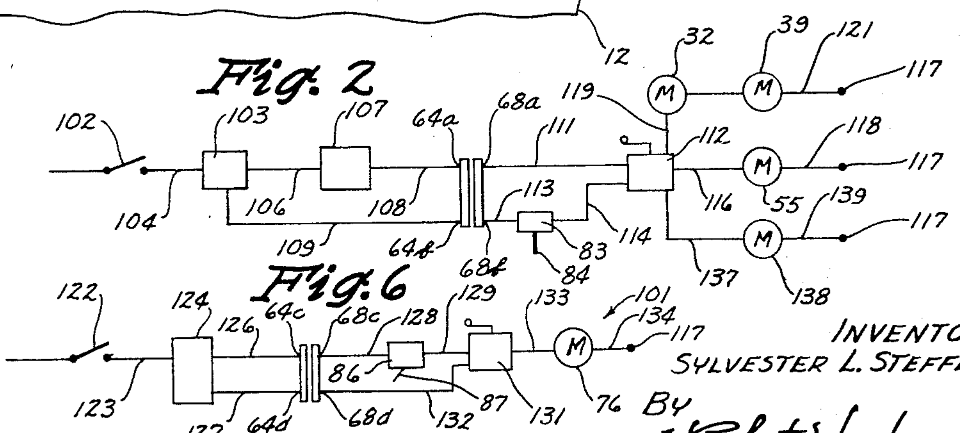
INVENTOR
SYLVESTER L. STEFFEN
BY
H. Robert Henderson
ATTORNEY United States Patent Office 3,438,517
Patented Apr. 15, 1969

3,438,517

APPARATUS AND METHOD FOR LEVELING AND EMPTYING MATERIAL IN AND FROM STORAGE BIN

Sylvester L. Steffen, 264 S. Walnut Ave., New Hampton, Iowa 50659

Filed Nov. 9, 1966, Ser. No. 593,070
Int. Cl. B65g *65/30*
U.S. Cl. 214—17 9 Claims

ABSTRACT OF THE DISCLOSURE

This invention pertains to an auger mounted at one end on a post in the center of a grain bin, with its outer end placed adjacent the bin wall. The auger is adapted to rest upon the grain, is movable about and relative to the center post, and is also movable vertically on the post by means of an arm and cable arrangement attached to the upper portion of the post. A pair of grain-engaging switches, movable with the auger, automatically control the raising and lowering of the auger, and the direction of rotation of the auger so that the auger both levels the grains as it is being filled into the bin and aids in discharging the grain from the bin. Additional to this arrangement is the provision of the center post being hollow and with an auger mounted therein, the center post and auger being connected to a horizontal auger and tube arranged at the bottom thereof, whereby grain may be discharged into the bin from the open upper end of the center post by the latter arrangement, as compared to grain being dumped into the bin from a hole in the roof thereof as is normally done.

This invention relates generally to the handling of bulk material, and more particularly to an apparatus having the dual capacity of leveling grain in a grain bin during the storing thereof, and of unloading the stored grain from the grain bin.

In the filling of a conventional grain bin, the grain tends to mound thus reducing the capacity of the bin. The mounding problem is overcome by either manually leveling the surface of the grain or by providing auxiliary equipment to deposit the grain uniformly in the bin. Centrifugal levelers have been designed to maintain a level surface, however the grain becomes overly compacted. Radially extended, horizontal augers mounted at the top of the bin, and rotatably mounted in tubes having discharge openings therein have also been designed to alleviate the mounding problem; however, the kernels have a tendency to separate from the fines with the fines collecting together thus creating the possibility of causing hot spots within the bin.

The unloading or emptying of grain from the bin is also complicated by the compaction of grain and the fact that all the grain will not move merely by gravity to the discharge opening, thus either manual shoveling or auxiliary equipment is required to completely empty the bin.

The filling and emptying of grain bins has therefore either required a considerable amount of manual distribution of grain or utilization of a number of separate pieces of equipment to adequately accomplish both the filling and emptying process.

It is an object of this invention to provide an improved grain bin leveling and emptying apparatus.

It is another object of this invention to provide a dual purpose binsweep auger which can be utilized to both level the grain within the bin as it is filled, and to move the grain to a discharge opening to empty the bin.

A further object of this invention is the provision of an apparatus for leveling and emptying grain from a grain bin which provides positive leveling with minimum attention on the part of the operator.

Another object of this invention is the provision of an apparatus which maintains a level surface in a grain bin without overly compacting the grain.

Yet another object of this invention is to provide a leveling apparatus which minimizes the separation of the fines and whole kernels during the process of filling the bin with grain.

Another object of this invention is the provision of a leveling and emptying apparatus which is automatically maintained on the surface of the grain when either leveling or emptying in response to the condition of the surface of the grain, and the height of same.

Another object of this invention is the provision of an upright tubular post serving as a guide support for the binsweep auger of the apparatus, which post serves also as a conduit for filling the bin.

Still another object of this invention is the provision of the post hereinbefore described which also serves to support the mechanism for raising and lowering the binsweep auger.

Still another object of this invention is the provision of an apparatus for leveling and emptying grain from a grain bin which is extremely effective in operation and rugged in construction.

These objects, and other features and advantages of this invention will become more readily apparent upon reference to the following description when taken in conjunction with the accompanying drawings, wherein:

FIG. 2 is a reduced fragmentary sectional view taken along the lines 2—2 in FIG. 1;

FIG. 3 is an enlarged sectional view taken along the lines 3—3 in FIG. 1;

FIG. 4 is a reduced vertical section of the grain bin filled with grain;

FIG. 5 is a greatly enlarged side elevational view, partly in section, of the cross arm and collar arrangement;

FIG. 6 is a schematic wiring diagram of the electrical system for filling, leveling and emptying the bin; and FIG. 7 is a schematic wiring diagram of the electrical system for vertically moving the binsweep auger.

Figure 1:
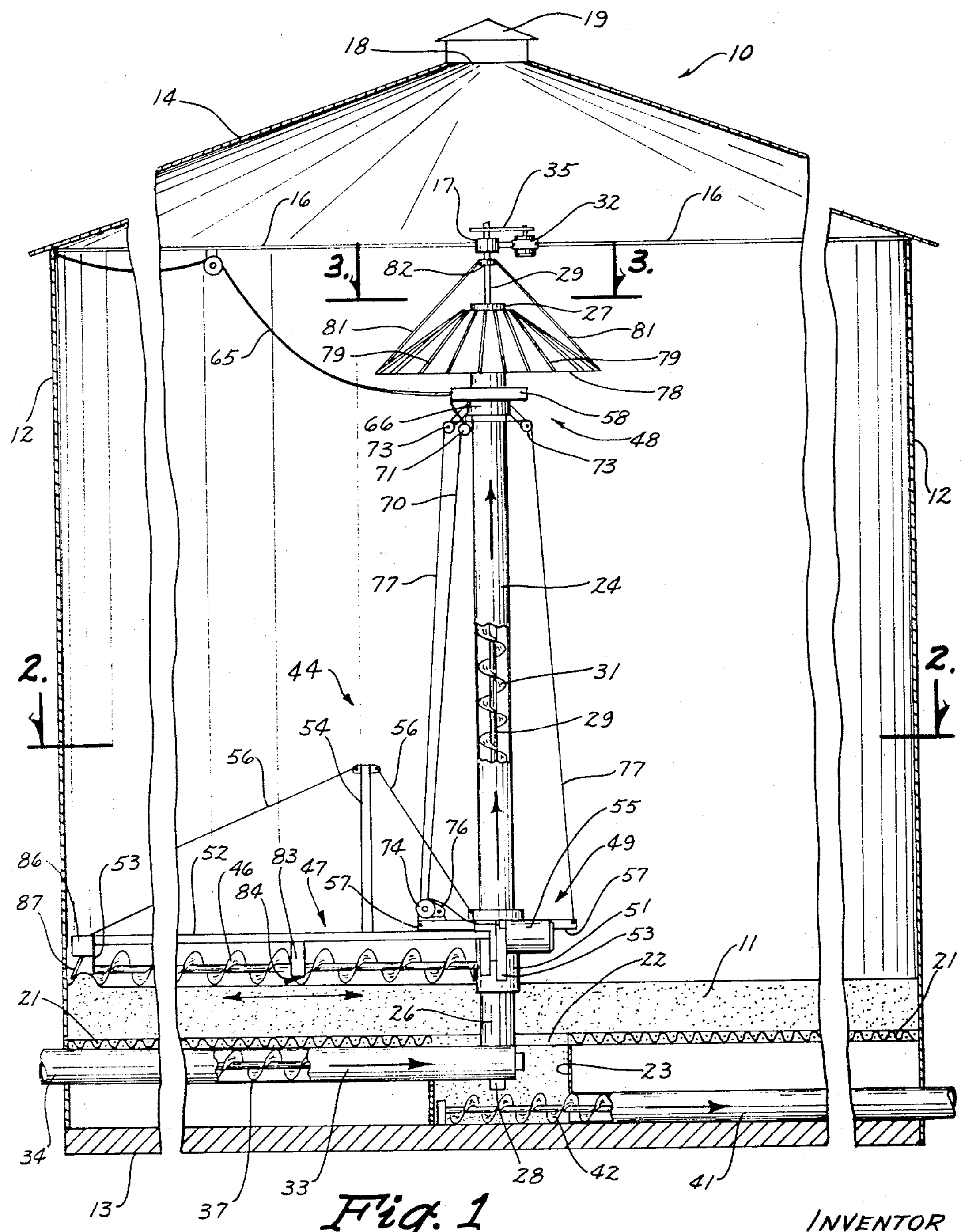
FIG. 1 is a foreshortened, vertical sectional view of a grain bin and showing the apparatus of this invention for leveling and emptying the grain in side elevation.

Referring to the drawings, a cylindrical grain bin 10 is shown generally in FIG. 1, partially filled with grain 11. The bin 10 is a conventional structure having a circular sidewall 12 mounted on a concrete base 13, and a conical shaped roof 14 supported on the top edge of the sidewall 12. The upper edges of the sidewall are braced by a framework of arcuately spaced, horizontally disposed rods 16 which are connected at their outer ends to the sidewall 12 and at their inner ends, at the center of the bin to a journal block 17. A filler opening 18, having a cover 19 extending thereover to protect the interior of the bin from the elements, is provided at the apex of the roof 14.

A perforated, horizontally disposed floor 21 is mounted between the sidewalls 12 and above the concrete base 13, and is supported by conventional substructure (not shown). A material discharge opening 22 is formed in the center of the floor 21, and a sump or hopper 23, open at the top is mounted therein which rests on the base 13.

Disposed within the bin 10 is an apparatus, indicated generally at 44 in FIG. 1 for leveling and emptying grain, comprising the post 24 (FIG. 1), an elongated auger 46, a unit 47 for supporting the inner end of the elongated auger 46 adjacent the post 24 and the outer end of the elongated auger adjacent the inner wall surface of the sidewalls 12, an arm unit 48 rotatably secured to the upper end 27 of the post 24, a cable device 49 connected to the element 47 and trained over the unit 48, and electric power and switch apparatus described more in detail hereinafter for providing automatic operation of the leveling and emptying of the bin. Additionally, the apparatus is workable in combination with a filling unit comprising the post 24, a filling tube 33, and associated controls.

Mounted in the center of the bin 10 is the upright hollow post 24 (FIG. 1) open at both ends, having the bottom end thereof rigidly supported in the sump 23 in operative connection with the inner end of a filling tube 33, and having the top end 27 thereof extending substantially to the upper reaches of the bin. Rotatably mounted within the post 24 is a vertically disposed, elongated shaft 29 having a helical flighting 31 mounted thereon, the auger shaft extending from the top of the post 24 at the upper block 17 to the bottom thereof where it is journaled in another block 28.

A first electric motor 32 is electrically connected to a source of power, as described hereinafter, and is secured to one of the rods 16, as best shown in FIG. 1. The motor 32 is mechanically connected, as by a belt and pulley unit 35, to the upper end of the shaft 29.

The horizontally disposed filling tube 33 (FIG. 1) is mounted below the floor 21, with one end 34 of the tube 33 disposed outside the bin and the other end of the tube connected to and communicating with the lower end 26 of the post 24. On the one end 34 of the tube 33 and adjacent the outer wall surface of the bin is mounted a hopper 36, as best shown in FIG. 4 for receiving grain to be transmitted into the bin 10. A filler auger 37, axially mounted in the tube 33 is operably connected at its outer end by a chain and pulley unit 38 to a second electric motor 39.

Disposed on the base 13 is a second horizontally disposed tube 41 (FIG. 1), which communicates at an inner end with the sump 23, with the outer end thereof disposed outside the bin 10. A discharge auger 42 is rotatably mounted in the second tube 41 and extends into and across the bottom of the sump 23, as shown in FIG. 1.

The supporting unit 47 includes a sleeve 51 (FIG. 1) mounted on the post 24 for vertical movement thereon and for rotation thereabout, and includes further an elongated boom 52 secured at the inner end thereof to the sleeve 51, with the outer end thereof disposed adjacent the inner surface of the sidewall 12. A pair of depending brackets 53 (only one showing) are secured at opposite ends of the boom 52 for rotatably supporting the elongated auger 46.

An upright stanchion 54 is mounted intermediate the ends of the boom 52 and a pair of flexible cables 56 attached to the upper end of the stanchion 54, with one cable attached at a free end to the outer end of the boom 52, and the other cable secured to the sleeve 51, support the boom 52 in a horizontally disposed plane about the post 24. Secured to the upper part of the sleeve 51 are a pair of diametrically opposed, outwardly extended wings forming a platform 57. A third electric motor 55 is attached to the platform 57 and is operably connected to the elongated auger 46 for rotating same.

The arm unit 48 (FIG. 1) comprises a collar 58 (FIG. 5) rigidly affixed by bolts 59 to the upper end of the post 24. A circular opening 61 is formed in the base of the collar 58 which communicates with a circular cavity 62 formed within the collar. A quartet of vertically spaced brushes indicated generally at 64 are mounted on the inner sidewall of the collar 58 and are electrically connected to an electric cable 65 inserted through an aperture 63 formed therefor in the collar 58.

Rotatably mounted within the cavity 62 and rotatable also relative to the post 24 is a slip ring 66 (FIG. 5) having a circular flange **66*a* which depends through the collar opening 61. The top of the slip ring 66, having a diameter greater than that of the opening 61, is rotatably supported by a plurality of ball bearings 67 mounted in a bearing race (not shown) secured internally of the collar 58. A quartet of vertically spaced collector rings indicated generally at 68 are secured to the periphery of the slip ring 66 internally of the collar 58, with each ring 68 in electrical contact with one of the brushes 64**.

A vertically disposed passage 69 (FIG. 5), adapted to carry an electric cord, is formed in the slip ring 66 and leads from each of the collector rings 68 to the base of the slip ring. An electric cord 70, carrying four wires with each wire electrically connected to one of the collector rings 68, is disposed in the passage 69 and connected to a spring loaded spool 71 mounted to the base of the slip ring 66 as described hereinafter.

A pair of diametrically opposed, depending arms 72 (FIG. 5) are secured to the slip ring 66 below the collar 58. Mounted on the outer end of each arm 72 is a pulley 73. In addition to the arm 72 and pulleys 73, the cable device 49 comprises a winch 74 (FIG. 1) mounted on the platform 57 and operably connected to a fourth electric motor 76. A cable 77 is secured at one end to the platform 57, at a place thereon substantially opposite the winch 74, trained over the pulleys 73, and secured at the other end to the winch 74.

Rotatably mounted on the upper end 27 of the post 24 is a frusto-conically shaped deflector cone 78 (FIGS. 1 and 3), having a plurality of arcuately spaced, radially extended ribs 79 (FIG. 3) mounted on the outer surface thereof. A trio of arcuately spaced rods 81 (FIG. 1) are each secured at one end to the cone 78 near its outer edge and at the other end to a band 82. The band 82 is secured to the shaft 29 intermediate the journal block 17 and the top end 27 of the post 24, whereby the deflector cone 78 is rotatable in response to rotation of the shaft 29.

The electrical control system for the apparatus 44 includes a pressure switch 86 (FIG. 1), operated by a depending sail 87, mounted on the outer end of the boom 52, and electrically connected to the fourth electric motor 76 for operating the winch 74. A second pressure switch 83, operated by a depending sail 84, is mounted intermediate the ends of the boom 52 and is electrically connected to the third electric motor 55. Both sails 84 and 87 are biased substantially straight downwardly wherein the switches 83 and 86 are normally open, and when either of the sails are pushed toward a horizontal condition, the respective switch is then closed. The sail 84 is positioned such that when horizontal, it is disposed substantially horizontally level with the lower reach of the auger 44 flighting.

The control system is schematically shown in FIGS. 6, 7 and 8. Electric power is connected to a switch box (not shown) having two on-off switches mounted therein. The first switch 102 (FIG. 6) is electrically connected to a circuit shunt 103 by a wire 104. The shunt 103 is connected by a wire 106 to a timer switch 107 and by a wire 108 mounted in the electric cable 65 (FIG. 5) to one of the brushes **64*a*. The shunt 103 is also connected to one of the brushes 64*b* by a wire 109 mounted in the electric cable 65**.

The collector ring **68*a*, electrically connected to the brush 64*a*, is connected by a wire 111 to a reversing switch 112. The collector ring 68*b*, electrically connected to the brush 64*b*, is connected by a wire 113 to the pressure switch 83, which in turn is connected by a wire 114 to the reversing switch 112. The reversing switch 112 is connected to the leveling auger motor 55 by a wire 116, and the motor is connected to a ground 117 by a wire 118, thus completing the circuit. The vertical auger and the filling auger motors 32 and 39 are connected in series by a wire 119 to the reversing switch 112 and to a ground 117 by a wire 121**.

The reversing switch 112 (FIG. 6) is also electrically connected by a wire 137 to a fifth motor 138 which is operable to drive the discharge auger 42 (FIG. 1) for emptying purposes. The motor 138 is connected by a wire 139 to the ground 117. The reversing switch 112 (FIG. 6) is operable in a first position to energize the motors 32, 39 and 55 for the vertical auger 31, filling auger 37, and leveling auger 46; and in a second position to reverse the direction of rotation of the leveling auger motor 55 and to energize the fifth motor 138. The second reversing switch 131 (FIG. 7) is operable in a first position to energize the winch motor 76, and in a second position to allow the shaft of the winch motor to rotate counter to that described above. The counter rotation of the winch motor allows the leveling auger 46 to descend by gravity, as described hereinafter.

The second switch 122 (FIG. 7) is connected by a wire 123 to a combination manual-automatic switch 124. The automatic side of the switch 124 is connected by a wire 126, mounted in the electric cable 65, to one of the brushes **64*c*, while the manual side of the switch 124 is connected by a wire 127 to one of the brushes 64*d*. The collector ring 68*c* and wire 128 electrically connects the brush 64*c* to the outer pressure switch 86 which in turn is connected by a wire 129 to a second reversing switch 131. The collector ring 68*d*, electrically connected to the brush 64*d*, is connected by a wire 132 to the reversing switch 131. The switch 131 is connected by a wire 133 to the winch motor 76 (FIG. 1), which in turn is wired to the ground 117 by a wire 134**.

In operation, the two switches 102 and 122 (FIGS. 6 and 7) are closed to energize the vertical auger and filling auger motors 32 and 39, respectively, the leveling auger motor 55 (FIG. 6) through the timer switch 107, and to activate the circuit to the second pressure switch 86 (FIG. 7). Grain is thus dumped into the hopper 36 (FIG. 4) and carried through the filler tube 33 and upwardly of the post 24, by the action of the augers, wherein it is deposited on the cone 78. As the cone 78 is connected to the shaft 29 (FIG. 1), it will rotate at the same rate of speed as the vertical auger 31, which will not cause the grain to be thrown out with considerable force thus causing a separation of the fines from the grain, but instead will deposit the grain in an evenly distributed annular mound around the post 24, with the apex of the mound positioned about the midway point between the post and the inner wall surface of the sidewalls 12. It will be noted that the midway point, as referred to hereinabove, is located at about the position of the pressure switch 83. It should be noted herein that the bin 10 may also be filled by transferring grain through the opening 18 and onto the rotating deflector cone 78 rather than by using the filler tube 33 and post 24 arrangement.

As the elongated auger 46 rotates about its axis, it contacts the upper surface of the grain deposited in the bin and the action of the elongated auger 46 will cause it to level the grain in the bin by pushing the grain toward the sidewalls. Contact between the axially rotating elongated auger 46 and the grain causes the elongated auger to crawl in a horizontal plane about the post 24, as shown by the arrow in FIG. 2, with the upper surface of the grain pushing the sail 84 upwardly, as shown in FIG. 1, thus closing the circuit through the wires 113 and 109 to the circuit shunt 103 (FIG. 6) and opening the circuit through the timer switch 107.

The axial rotation of the elongated auger 46 levels the grain by moving the grain outwardly toward the sidewalls 12 and causes it to form a mound adjacent the inner wall surface of the sidewall and directly below the second pressure switch 86 and its sail 87. The mound forces the second sail 87 upwardly thus closing the second pressure switch 86 and energizing the winch motor 76 (FIG. 7). The operation of the winch motor 76 activates the winch 74 and causes the elongated auger 46 and platform 47 to move vertically upon the post 24 until the sail 87 resumes a vertical position thus opening the circuit and deactivating the winch motor 76.

The leveling action of the elongated auger 46 and the automatic raising thereof continues until the hopper 36 is emptied and the grain is leveled at which time the automatic raising of the auger causes the sail 84 to drop to a vertical position which shuts off the current flow to the first, second and third motors 32, 39, and 55. The timer switch 107 can be set for a predetermined time for directing current to the motors 39, 55 and 138 and overriding the switch 83 thereby. The shunt 103 operates such that upon deactivation of current through the timer circuit, current will flow only through the pressure switch 83 circuit until the shunt is manually reset.

To empty the bin, the first and second reversing switches 112 and 131 are shifted to a second position and the switches 102 and 122 are closed thus sending current toward all motors. The discharge auger 42 transports the grain from the bin through the discharge tube 41 and causes the grain in the bin to form a cone-shaped opening within the bin around the post 24. The elongated auger 46, rotating counter to its leveling action rotation now pulls the grain from the sidewalls toward the post 24 thus providng a continuous supply of grain to the sump 23 and the discharge auger 42.

Due to the withdrawal of grain from the sidewall 12 of the bin 10, the sail 87 remains vertical with the winch motor 76 inoperative; and as the auger 46 continually rests upon the grain during the emptying process, the sail 84 remains horizontal, with the motors 55 and 138 operating effectively. As the grain is emptied, the auger 46 and platform 47 move gradually downwardly relative to the post 24 due to gravity, the cable 70 playing out slowly as the platform 47 sinks.

It is noted that should it be desirable to manually control the raising and lowering of the auger 46 and platform, with or without operation of the other elements, the switch 124 (FIG. 7) has a manual control for just that purpose.

Although a preferred embodiment of this invention has been described and disclosed hereinbefore, it is to be remembered that various modifications and alternate constructions can be made thereto without departing from the true spirit and scope of the invention.

I claim:

1. Apparatus for leveling and emptying material from a circular bin having an emptying auger and tube below the floor of the bin and in communication with the interior of the bin, the apparatus comprising:
   - an upright post mounted centrally in the bin;
   - a reversibly rotatable auger;
   - means supporting the inner end of said auger adjacent said post and the outer end of said auger adjacent the inner wall surface of the bin, said supporting means mounted at an inner end thereof to said post for vertical movement thereon, and for relative rotation thereabout;
   - arm means rotatably secured to the upper end of said post;
   - cable means connected to and extended between said supporting means and said arm means, said cable means operable to vertically move said supporting means on said post, said arm means rotatable with said supporting means in response to circular movement of said cable means about said post by said support means;
   - power means operably connected to said cable means and to said auger for selectively operating said cable means and for reversibly rotating said auger about its longitudinal axis; and
   - switch means mounted on said supporting means and electrically connected to said power means for operating said power means in response to the condition of the upper surface of grain within the bin.

2. Apparatus for leveling and emptying grain from a grain bin as defined in claim 1, and further wherein said post is hollow and open at both ends; and including further a vertically disposed auger rotatably mounted in said post, a horizontally disposed filler tube mounted below the floor of the bin having one end disposed outside the bin and having the other end disposed at the lower end of said post, a filler auger rotatably mounted in said filler tube having the inner end thereof abutting said vertical auger, said filler auger adapted to transport grain through said filler tube to said vertical auger, and said vertical auger adapted to transport the grain from said filler auger to the upper end of said post, wherein the grain is discharged from said post and deposited, by gravity, into the bin.

3. Apparatus for leveling and emptying grain as defined in claim 2, and further wherein said auger is horizontally disposed and has a length approximately equal the radius of the bin.

4. Apparatus for leveling and emptying grain as defined in claim 3, and further wherein said supporting means is movable simultaneously vertically on and horizontally about said post.

5. Apparatus for leveling and emptying grain as defined in claim 4, and further wherein said arm means comprises a collector ring unit having a stationary portion secured to said post and a portion rotatable relative to said stationary portion, said unit operable to receive electric power from a source externally of the apparatus to said power means.

6. Apparatus for leveling and emptying grain as defined in claim 5, and further wherein said cable means comprises a cable and a winch for operating said cable, said winch mounted on said supporting means on one side of said post, said cable operatively connected to said winch, trained upwardly and over said arm means, and connected to said supporting means on opposite sides of said post relative to said winch.

7. Apparatus for leveling and emptying grain as defined in claim 6, and further wherein said switch means comprises a pair of pressure switches one of which is positioned adjacent the outer end of said auger, and the other of which is positioned intermediate the ends of said auger.

8. Apparatus for leveling and emptying grain as defined in claim 7, and further wherein said power means is operable to rotate said filler auger and said vertical auger for transferring material from external said bin inwardly through said filler tube and upwardly through said post for discharge at the upper end of said post into the interior of the bin.

9. The process of successively level filling material into a storage bin and emptying the bin comprising the steps:
- discharging the material into the bin well above the floor thereof;
- throwing the discharged material circularly about the bin for gravitational falling in a circular mound;
- leveling the surface of the mounded material by moving the material on the surface horizontally radially outwardly from the center of the bin, and simultaneously moving the material arcuately relative to the center of the bin;
- constantly detecting the surface height of the levelled material and vertically readjusting the horizontal radial and arcuate leveling operation in response to a detected change in said surface height;
- ceasing the movement of the material in response to a ceasing of the discharging of the material into the bin;
- withdrawing the material at the bottom of the bin from the center thereof radially outwardly and externally of the bin;
- moving the material on the surface horizontally radially inwardly toward the center of the bin, and simultaneously moving the material arcuately relative to the center of the bin;
- gradually lowering the material movement operation in response to the height of the surface of the material; and
- ceasing the withdrawal, inward and arcuate material moving operations.

References Cited

UNITED STATES PATENTS

| | | | |
|---|---|---|---|
| 2,649,215 | 8/1956 | Dickson | 214—17 |
| 3,241,581 | 3/1966 | Richardson et al. | 214—17 |
| 3,297,177 | 1/1967 | Zeiter | 214—17 |

ROBERT G. SHERIDAN, *Primary Examiner.*

U.S. Cl. X.R.

214—152